United States Patent [19]
Mayer et al.

[11] Patent Number: 5,238,973
[45] Date of Patent: Aug. 24, 1993

[54] PROCESS FOR THE PREPARATION OF POLYUREA ELASTOMERS CONTAINING URETHANE GROUPS

[75] Inventors: Eduard Mayer; Manfred Schmidt, both of Dormagen; Hans-Joachim Meiners; Andreas Ruckes, both of Leverkusen, all of Fed. Rep. of Germany

[73] Assignee: Bayer Aktiengesellschaft, Leverkusen, Fed. Rep. of Germany

[21] Appl. No.: 877,685

[22] Filed: May 1, 1992

[30] Foreign Application Priority Data

May 8, 1991 [DE] Fed. Rep. of Germany ....... 4115037

[51] Int. Cl.$^5$ .............................................. C08G 18/14
[52] U.S. Cl. ..................................... 521/159; 521/61; 521/64; 264/51; 264/328.1; 264/328.6; 264/328.8
[58] Field of Search .................... 521/159; 528/61, 64; 264/51, 328.1, 328.6, 328.8

[56] References Cited

U.S. PATENT DOCUMENTS

| | | | |
|---|---|---|---|
| 3,428,610 | 2/1969 | Klebort | 260/75 |
| 4,218,543 | 8/1980 | Weber et al. | 521/51 |
| 4,297,444 | 10/1981 | Gilbert et al. | 521/160 |

FOREIGN PATENT DOCUMENTS

| | | |
|---|---|---|
| 075130 | 3/1983 | European Pat. Off. . |
| 3827595 | 2/1990 | Fed. Rep. of Germany . |

Primary Examiner—Maurice J. Welsh
Attorney, Agent, or Firm—Joseph C. Gil; N. Denise Brown

[57] ABSTRACT

A process for the preparation of optionally cellular elastic moldings by the reaction injection molding technique in closed molds, in which isocyanate prepolymers A) based on
a) polyisocyanates of the diphenylmethane series and
b) polyether polyols having a maximum hydroxyl functionality of 2.4 are reacted with a reactive component B) consisting essentially of aromatic, alkyl-substituted diamines, optionally with the addition of auxiliary agents and additives d).

10 Claims, No Drawings

PROCESS FOR THE PREPARATION OF POLYUREA ELASTOMERS CONTAINING URETHANE GROUPS

BACKGROUND OF THE INVENTION

The present invention relates to a new process for the preparation of urethane group-containing polyurea elastomers based on polyisocyanates or polyisocyanate mixtures of the diphenylmethane series, relatively high molecular weight polyhydroxyl compounds and alkyl substituted aromatic diamines by the reaction injection moulding technique.

The preparation of urethane group-containing polyurea elastomers based on polyisocyanates or polyisocyanate mixtures of the diphenylmethane series, relatively high molecular weight polyhydroxyl compounds and alkyl substituted aromatic diamines by the reaction injection moulding technique has already been disclosed in U.S. Pat. No. 4,218,543, which describes a one-shot process. In this process, the polyisocyanate components are mixed with compounds containing isocyanate reactive groups as well as additives. The process requires the use of catalysts for the reaction between isocyanate groups and hydroxyl groups.

It is known from German Offenlegungsschrift 3,827,595 (which corresponds to U.S. application Ser. No. 07/386,084, filed Jul. 28, 1989) that a virtually complete preliminary reaction of the relatively high molecular weight polyol component b) with the polyisocyanate component a) followed by reaction of the resulting isocyanate semiprepolymers with the diamine component leads to numerous remarkable advantages compared with the one-shot method, in particular as regards the mechanical and thermomechanical properties such as dimensional stability under heat in spite of large and differing volume streams (large volume of the isocyanate semiprepolymers, small volume of the diamine component).

The authors of the U.S. Pat. No. '595 reference, however, were obviously of the view that the preparation of high quality elastomers would only succeed if the relatively high molecular weight polyhydroxyl compounds b) had an average hydroxyl functionality of at least 2.5.

Although the process according to the U.S. Pat. No. '595 reference permits the production of elastomeric mouldings having a high level of mechanical properties, it has the disadvantage that the necessity to use branched polyhydroxyl compounds b) results in relatively high viscosities of the isocyanate semiprepolymers, so that the filling of large or complicated molds is in many cases difficult or impossible, especially when mineral reinforcing materials are used.

U.S. Pat. No. 4,297,444 describes the production of polyurethane moldings by the reaction injection molding technique using organic polyisocyanates, relatively high molecular weight polyhydroxyl compounds and low molecular weight chain lengthening agents. In the preferred embodiment, the total quantity of relatively high molecular weight polyhydroxyl component is first reacted with the polyisocyanate component to produce an isocyanate semiprepolymer, but this prior publication gives no indication that systems utilizing a diamine component which consists of alkyl substituted aromatic diamines, could also be processed on this principle or that any advantages would result from such a process. Although aromatic diamines are mentioned by the way in the list of suitable chain lengthening agents, the use thereof is not further discussed. In fact, the chain lengthening agents mentioned as preferred are simple diols such as ethylene glycol or 1,4-butanediol. Only ethylene glycol is used in the examples. The possibility that reactive systems consisting of a large volume stream of isocyanate semiprepolymer and a small volume stream of highly reactive diamines could be processed by the reaction injection molding technique thus could not be deduced from the teaching of this reference.

German Auslegeschrift 1,240,654 describes the use of monomer-free, i.e. true isocyanate prepolymers, based on polyisocyanates other than those of the type to be used according to the invention and difunctional polyhydroxyl compounds, which are reacted with alkyl substituted diamines, preferably in the presence of solvents, by the classical prepolymer process and by no means on the principle of the reaction injection moulding technique.

Published European patent application 0,075,130 describes a process similar to that described in U.S. Pat. No. 4,218,543, where certain prepolymers are used. However, the reference generally describes using a significant amount of high molecular weight polyol in the B-side.

DESCRIPTION OF THE INVENTION

The process according to the present invention is based on the surprising observation that even when relatively high molecular weight polyhydroxyl compounds b) having an average hydroxyl functionality of from 1.9 to 2.4 are used, elastomeric moldings having a high level of mechanical properties may be obtained by the above-mentioned semiprepolymer process, using the reaction injection molding technique. The process is particularly distinguished by the following advantages:

1) The viscosity of the semiprepolymers obtained from the starting components is very considerably reduced even when the other parameters are substantially the same. Thus a semiprepolymer used according to the invention having an isocyanate content of 11.5% and based on polyetherdiols with OH number 56 has a maximum viscosity at 25° C. of 3000 mPa.s, while an analogous semiprepolymer according to the U.S. Pat. No. '595 reference having an isocyanate content of 11.5% based on an otherwise analogous polyethertriol with OH number 56 has a viscosity at 25° C. of at least 4500 mPa.s.

2) According to the invention, higher functional and therefore in many cases less expensive polyisocyanate mixtures of the diphenylmethane series may be used as polyisocyanate component.

3) The process according to the invention results in moldings having comparatively improved mold release characteristics.

4) A more rapid build-up of hardness (SHORE D) is obtained as a result of the process of the present invention.

5) When polypropylene oxide polyethers having hydroxyl numbers $\geq 28$ are used, which is quite easily possible according to the invention, transparent moldings may be produced.

More particularly, the present invention is directed to a process for the production of elastic moldings (which may be cellular) having a non-cellular surface layer, comprising:

1) reacting a) a polyisocyanate component consisting essentially of at least one polyisocyanate or polyisocyanate mixture of the diphenylmethane series which has optionally been liquefied by chemical modification, with b) a polyol component having an average molecular weight of from 1000 to 6000 and an average hydroxyl functionality of no more than 2.4, and consisting essentially of at least one polyether polyol which may contain dispersed organic fillers, at an NCO/OH equivalent ratio of at least 3.2:1 to form an isocyanate semiprepolymer A), 2) reacting via the reaction injection molding technique in a closed mold, said semiprepolymer A) with a component B) consisting essentially of b) said polyol component, c) aromatic diamines having an alkyl substituent in at least one ortho-position to the amino groups, and optionally d) isocyanate reactive auxiliary agents and additives known from polyurethane chemistry, at an isocyanate index of from 70 to 130, and wherein the amount of said polyol component b) used to produce said semiprepolymer is at least 90% by weight of the total amount of said polyol component used in both reaction steps.

In the first reaction step of this process, at least 90% of component b) is reacted with the total quantity of component a) which is then reacted in a second reaction step by the reaction injection molding technique in a closed mold with a component B) under conditions maintaining an isocyanate index, based on the isocyanate groups of component A) and the isocyanate reactive groups of component B), of from 70 to 130. Component B) consists essentially of from 0 to 10% of component b), component c) and the isocyanate reactive single components of the optionally used component d). In addition, non-isocyanate reactive auxiliary agents and additives d) can be added to either component A) and/or of component B). The process is characterized in that component b) has an average hydroxyl functionality of at most 2.4.

The term "polyisocyanate of the diphenylmethane series" is a generic term applying to all polyisocyanates obtainable from the phosgenation of aniline/formaldehyde condensates and present as mixtures in the phosgenation products. The term "polyisocyanate mixture of the diphenylmethane series" stands for any mixtures of polyisocyanates of the diphenylmethane series, i.e., for example, the above-mentioned phosgenation products, the mixtures obtained as distillates or distillation residues from the distillative separation of such mixtures, and any mixtures of polyisocyanates of the diphenylmethane series.

The term "isocyanate semiprepolymer" stands for reaction products of polyisocyanates of the type to be used as component a) according to the invention with subequivalent quantities of relatively high molecular weight polyhydroxyl compounds of the type to be used as component b) according to the invention. Components a) and b) are used for the preparation of the isocyanate semiprepolymers (i.e., component A) in quantitative ratios corresponding to an NCO/OH equivalent ratio of from 3.2:1 to 19:1, preferably from 4:1 to 10:1, most preferably from 5:1 to 7:1. Further, in the context of the present invention, the nature and quantitative ratios of components a) and b) are preferably so chosen that the semiprepolymers A) have a viscosity at 25° C. of at most 3000 mPa.s, preferably from 1000 to 2600 mPa.s, and an isocyanate content of from 8 to 15, preferably from 10 to 14% by weight.

By "isocyanate index" is meant the quotient of the number of isocyanate groups and the number of isocyanate reactive groups multiplied by 100.

In the process according to the invention, any polyisocyanate of the diphenylmethane series may be used as starting component a), optionally in a modified form. The chemical modification is a chemical reaction leading to liquefaction of solid polyisocyanates, in particular of 4,4'-diisocyanatodiphenylmethane.

Typical examples of suitable polyisocyanates a) include: 4,4'-Diisocyanatodiphenylmethane, mixtures thereof with 2,2'- and in particular 2,4'-diisocyanatodiphenylmethane; mixtures of these diisocyanatodiphenylmethane isomers with their higher homologues as obtained from the phosgenation of aniline/formaldehyde condensates; modified di- and/or polyisocyanates obtained by partial carbodiimidization of the isocyanate groups of the above-mentioned di- and/or polyisocyanates; and any mixtures of such polyisocyanates.

Up to 30% by weight, preferably up to 20% by weight, based on component a), of urethane group-containing reaction products of the above-mentioned di- and/or polyisocyanates with subequivalent quantities of aliphatic polyhydroxyl compounds in the molecular weight range of from 62 to 700 such as, for example, ethylene glycol, trimethylolpropane, propylene glycol, dipropylene glycol or polypropylene glycols in the above-mentioned molecular weight range may, if desired, also be used for the semiprepolymerization.

Polyol component b) has an average molecular weight calculated from the hydroxyl group content and the hydroxyl functionality, of from 1000 to 6000, preferably from 1500 to 3000, most preferably from 1700 to 2500, and an average hydroxyl functionality of from 1.9 to 2.4, most preferably from 1.9 to 2.1. The polyols of component b) are most preferably polyetherdiols obtainable by the known reaction of alkoxylation of difunctional starter molecules such as water, ethylene glycol or propylene glycol, but all polyether polyols or mixtures of polyether polyols conforming to the above definitions are also suitable. Polyether polyols containing organic fillers in a dispersed form may also be used. These dispersed fillers may be, for example, vinyl polymers as obtained, for example, by the polymerization of acrylonitrile and styrene in the polyether polyols as reaction medium (U.S. Pat. Nos. 3,383,351, 3,304,273, 3,523,093 and 3,110,695 and German patent 1,152,536) or polyureas or polyhydrazides obtainable from organic diisocyanates and amines, diamines or polyamines or hydrazine by a polyaddition reaction in the polyether polyols as reaction medium (German patent 1,260,142 and German Offenlegungsschriften 2,423,984, 2,513,815, 2,550,833, 2,550,862, 2,633,293 or 2,550,796).

The polyether polyols are prepared in known manner by the alkoxylation of suitable starter molecules or of mixtures of suitable starter molecules, in particular using propylene oxide and optionally also ethylene oxide for the alkoxylation. The following are examples of suitable starter molecules: water, ethylene glycol, propylene glycol, glycerol, trimethylolpropane, pentaerythritol, sorbitol, cane sugar and mixtures of such compounds. The functionality of the starter molecules or the average functionality of mixtures of starter molecules must be adapted to the conditions given above concerning the hydroxyl functionality.

Polyether polyols b) whose preparation by the alkoxylation of suitable starter molecules was carried out using propylene oxide as the only alkylene oxide and in which the hydroxyl groups are therefore predominantly secondary hydroxyl groups are also particularly suitable.

Component c) consists of diamines having exclusively aromatically bound primary amino groups and carrying an alkyl substituent in at least one ortho-position to the amino groups, in particular diamines which have at least one alkyl substituent in the ortho-position to the first amino group and two alkyl substituents, each having 1 to 4, preferably 1 to 3 carbon atoms, in the ortho-position to the second amino group. Those which have an ethyl, n-propyl and/or isopropyl substituent in at least one ortho-position to the amino groups and optionally methyl substituents in other ortho-positions to the amino groups are particularly preferred. The following are examples of such diamines or preferred diamines: 2,4-Diaminomesitylene; 1,3,5-triethyl-2,4-diaminobenzene; 1,3,5-triisopropyl-2,4-diaminobenzene; 1-methyl-3,5-diethyl-2,4-diaminobenzene, and commercial mixtures thereof with 1-methyl-3,5-diethyl-2,6-diamino-benzene; and 3,5,3′,5′-tetraisopropyl-4,4′-diaminodiphenylmethane.

Mixtures of such diamines may also be used as component c). 1-Methyl-3,5-diethyl-2,4-diaminobenzene and commercial mixtures thereof with 1-methyl-3,5-diethyl-2,6-diaminobenzene (DETDA) are particularly preferred components c).

The auxiliary agents and additives d) optionally used may be, for example, mineral fillers, conductive fillers such as conductive carbon blacks, dyes, pigments, organic blowing agents and/or internal mold release agents. Such auxiliary agents and additives, which are known per se, have been described, for example, European patent 81,701. Glass fibers, for example, are preferred mineral fillers while zinc stearate in combination with suitable solubilizers (German Offenlegungsschriften 3,626,673 and 3,639,502 and U.S. Pat. No. 4,519,965) and/or ricinoleic esters (German Offenlegungsschrift 3,436,163) are preferred internal mold release agents. The above-mentioned solubilizers for zinc stearate are often isocyanate reactive compounds. The auxiliary agents and additives d) thus in many cases contain such isocyanate reactive components. Other isocyanate reactive compounds, such as, for example, aliphatic polyols in the molecular weight range of from 62 to 1000, which are free from nitrogen or may contain tertiary amine nitrogen atoms, may also be present in component d). Compounds containing isocyanate reactive groups optionally present in the optionally used component d) are thus mainly compounds selected from (i) aliphatic polyols in the molecular weight range of from 62 to 1000 optionally containing tertiary amine nitrogen atoms, (ii) aliphatic aminopolyethers in the molecular weight range of from 200 to 3000 having at least two primary amino groups and (iii) mixtures of such compounds. When compounds d) containing isocyanate reactive groups are used, these compounds form part of component B). Further, if the auxiliary agents and additives d) are inert in isocyanate addition reactions, they may be added to either or both component A) and component B). The quantity of optionally used isocyanate reactive compounds d) may be up to 50 equivalents percent, preferably up to 20 equivalents percent in the sense of the isocyanate addition reaction, based on the amino groups of component c).

For carrying out the process according to the invention, an isocyanate semiprepolymer A) is first prepared from polyisocyanate component a) and at least 90%, preferably the total quantity, of polyol component b). This reaction is generally carried out in the temperature range of from 25 to 100° C. Various methods may be used for the preparation of the isocyanate semiprepolymers. For example, the total quantity of polyisocyanate component a) may be reacted with the total quantity of component b) provided for the preparation of the isocyanate semiprepolymers A) or alternatively, only part of polyisocyanate a) may first be reacted with the quantity of component b) provided for the preparation of the isocyanate semiprepolymers, and the reaction product thus obtained may then be mixed with the remainder of polyisocyanate component a).

The isocyanate semiprepolymers thus obtained constitute component A) for the subsequent reaction.

In the second stage of the process according to the invention, component A) is reacted with component B) by the reaction injection molding technique in closed molds.

Component B) consists essentially of up to 10% of the polyol component b) which has not been used for the preparation of the isocyanate semiprepolymers A), the diamine component c) and the optionally used auxiliary agents and additives d) containing isocyanate reactive groups.

The optionally used auxiliary agents and additives containing isocyanate inert groups may, as already mentioned, be incorporated with either or both of component A) and component B) for carrying out the second stage of the process.

In the second stage of the process according to the invention, the reaction injection molding technique ("RIM process") is employed, which is described, for example, in the literature references cited above. In this process, the reactive components A) and B) are used in quantities corresponding to an isocyanate index, based on these two components, of from 70 to 130, preferably from 90 to 120.

The quantity of reaction mixture introduced into the mold is calculated to yield moldings having a density of from 0.8 to 1.4 g/cm$^3$, preferably from 1.0 to 1.3 g/cm$^3$. Moldings which have a density of from 0.8 to about 1.0 g/cm$^3$ are microcellular elastomers, i.e. they are not true foams having a foam structure visible with the naked eye. This means that the optionally used blowing agents function less as true blowing agents and rather as flow improvers. Moldings having a density above 1.2 g/cm$^3$ are obtained in particular when mineral fillers are used.

The starting temperature of the reaction mixture of components A) and B) introduced into the mold is generally from 20° to 80° C., preferably from 40° to 70° C. The temperature of the mould is generally from 30° to 130° C., preferably from 40° to 20° C. and most preferably from 90° to 110° C.

The molds used are of the type generally known in the art and preferably are made of aluminum or steel. The internal walls of the mold may be coated with known external mold release agents to improve the mold release properties.

The moldings may generally be removed from the mold after a dwell time in the mold of from 5 to 180 seconds. Release from the mold may be followed by tempering at a temperature of about 60° to 180° C. for a period of from 30 to 120 minutes.

The moldings obtainable by the process according to the invention are suitable in particular for the manufacture of flexible car body elements, e.g. the front and rear bonnets of motor vehicles, side panels, mudguards and side rails or, when free from glass fibers, they may also be used as run-flat tires (to assist driving when tires are defective).

In the following Examples, all percentages are percentages by weight unless otherwise indicated.

EXAMPLES

The formulations described in the following Examples were worked up by the reaction injection molding technique.

The isocyanate semiprepolymers (=Component A)) and Component B) containing the diamine c) were delivered to a high pressure metering apparatus and after they had been intensively mixed in a force controlled mix head they were very rapidly forced into a temperature controlled hot metal mold whose internal wall had been coated with a commercially available soap-based external mold release agent, known as RTCW 2006 marketed by Chem Trend.

The plate mold of steel is designed for the production of test plates measuring 300×200×3 mm.

The mold was filled from the long side by way of a restrictor bar gate.

EXAMPLE 1

Preparation of a Semiprepolymer A 92 kg of a polyisocyanate mixture of the diphenylmethane series having an isocyanate content of 32.5% and containing 90% of diisocyanatodiphenylmethane isomers (the remainder being higher functional polyisocyanates) which in turn contain about 90% of 4,4'-diisocyanatodiphenylmethane (=Component a) were reacted for two hours at 80° C. with 109.7 kg of polypropylene glycol having a molecular weight of 2000 (=Component b). The end product had an isocyanate content of 12.4% and a viscosity of 2200 mPa.s at 25° C.

EXAMPLE 2

Preparation of a Semiprepolymer A

A mixture (Component a) of 256 kg of 4,4'-diisocyanatodiphenylmethane and 64 kg of 4,4'-diisocyanatodiphenylmethane which has been modified by partial carbodiimidization of the isocyanate groups and has an isocyanate content of 30% was reacted with (Component b) 446.8 kg of a polyether diol with OH number 28 prepared by the propoxylation of propylene glycol followed by ethoxylation of the propoxylation product (PO:EO ratio by weight=87:13) for two hours at 80° C. The semiprepolymer thus obtained has an isocyanate content of 12.3% and a viscosity of 1150 mPa.s at 25° C.

EXAMPLE 3

Process According to the Invention

100 Parts by weight of the semiprepolymer A) from Example 1 (Component A) were reacted by the reaction injection molding process with 29.6 parts by weight of a mixture (i.e., Component B) of 14.43 parts by weight of 1-methyl-3,5-diethyl-2,4-diaminobenzene, 7.77 parts by weight of 1-methyl-3,5-diethyl-2,6-diaminobenzene, 2.96 parts by weight of a polyricinoleic acid ester with OH number 30, 1.48 parts by weight of Jeffamine D400 (Trade product of Texaco, difunctional aliphatic aminopolyether, molecular weight 400), 1.4 parts by weight of zinc stearate and 1.48 parts by weight of a polyether polyol with OH number 810 prepared by the propoxylation of ethylene diamine (ratio of volume streams about 4:1).

The temperature of the mold was 110° C. and the residence time in the mold was 30 seconds. The molding obtained under these conditions was easily removed from the mold and had a flawless appearance.

The following mechanical values were determined on test plates which had been tempered for 30 minutes at 120° C. and 160° C., respectively.

| Index = 105 | 120° C. | 160° C. |
| --- | --- | --- |
| Gross density (DIN 53420): | 1.104 g/cm$^3$ | 1.104 g/cm$^3$ |
| Shore D (DIN 53505): | 65 | 69 |
| Tensile strength (DIN 53504): | 33 mPa | 34 mPa |
| Elongation at break (DIN 53504): | 146% | 156% |
| SAG Test 100 mm projection: | 5 mm | 3 mm |
| SAG Test 150 mm projection: | 23 mm | 21 mm |
| Shrinkage x-axis | 2.009% | 2.075% |
| Shrinkage y-axis | 1.990% | 2.032% |

EXAMPLE 4

Process According to the Invention

The procedure employed in this Example was the same as in Example 3 except that 20 parts by weight of glass fibers were added as fillers to the semiprepolymer A) before the reaction. (Volume streams about 4.5:1)

| Index = 105 | 120° C. | 160° C. |
| --- | --- | --- |
| Gross density (DIN 53420) | 1.231 g/cm$^3$ | 1.227 g/cm$^3$ |
| Shore D (DIN 53505): | 70 | 73 |
| Tensile strength (DIN 53504)[1]: | L = 29/Q = 26 MPa | L = 29/Q = 26 MPa |
| Elongation at break (DIN 53504): | L = 100/Q = 85% | L = 95/Q = 90% |
| SAG test 100 mm projection[2]: | 3 mm | 0 mm |
| SAG test 150 mm projection: | 16 mm | 8 mm |
| Shrinkage x axis | 0.519% | 0.639% |
| Shrinkage y axis | 1.378% | 1.548% |

[1]L = longitudinal direction Q = transverse direction
[2]SAG test carried out for 60 minutes at 160° C.

EXAMPLE 5

100 Parts by weight of isocyanate semiprepolymer A from Example 2 (Component A) were reacted by the RIM process with 29.6 parts by weight of a mixture (Component B)) of 14.43 parts by weight of 1-methyl-3,5-diethyl-2,4-diaminobenzene, 7.77 parts by weight of 1-methyl-3,5-diethyl-2,6-diaminobenzene, 2.96 parts by weight of the polyricinoleic acid ester from Example 3, 1.48 parts by weight of Jeffamine D 400, 1.48 parts by weight of zinc stearate and 1.48 parts by weight of the polyether polyol with OH number 810 from Example 3 (ratio of volume streams about 3.4:1).

The temperature of the mold was 110° C. and the residence time in the mold was 75 seconds. The molding obtained under these conditions had good mold release properties and a flawless appearance.

The following mechanical properties were determined on test plates which had been tempered for 30 minutes at 120° C. and at 160° C.

| Index = 105 | 120° C. | 160° C. |
|---|---|---|
| Gross density (DIN 53420): | 1.099 g/cm³ | 1.104 g/cm³ |
| Shore D (DIN 53505): | 60 | 62 |
| Tensile strength (DIN 53504): | 24 mPa | 27 mPa |
| Elongation at break (DIN 53504): | 257% | 266% |
| SAG test 100 mm projection: | 3 mm | 2 mm |
| SAG test 150 mm projection: | 18 mm | 11 mm |
| Shrinkage x-axis | 1.930% | 1.977% |
| Shrinkage y-axis | 1.938% | 1.979% |

EXAMPLE 6

Influence of the Funtionality of Component b) on the Viscosity of the Semiprepolymers A The viscosities (at 25° C.) of isocyanate semiprepolymers A having isocyanate contents of 11.5%, 12.5% and 13.5%, respectively, are compared in the following Table. Polyisocyanate component a) from Example 1 and the polypropylene glycol with OH number 56 (functionality=2) or propoxylated trimethylolpropane with OH number 56 (functionality =3) were used in all cases for the preparation of the isocyanate prepolymers. The comparison shows the extreme increase in viscosity resulting from the increase in functionality of component b).

TABLE 1

| OH number [mg KOH/g] | Functionality | Viscosity[2) at 25° C. [mPa · s] | NCO content [%] |
|---|---|---|---|
| 56 | 2 | 2800 | 11.5 |
| 56 | 3 | 4700 | 11.5 |
| 56 | 2 | 2200 | 12.5 |
| 56 | 3 | 3700 | 12.5 |
| 56 | 2 | 1700 | 13.5 |
| 56 | 3 | 2800 | 13.5 |

Although the invention has been described in detail in the foregoing for the purpose of illustration, it is to be understood that such detail is solely for that purpose and that variations can e made therein by those skilled in the art without departing from the spirit and scope of the invention except as it may be limited by the claims.

What is claimed is:

1. A process for the production of elastic moldings comprising:
   a) a polyisocyanate component consisting essentially of at least one polyisocyanate or polyisocyanate mixture of the diphenylmethane series, with
   b) a polyol component having an average molecular weight of from 1000 t 6000 and an average hydroxyl functionality of no more than 2.4, and consisting essentially of at least one polyether polyol, at an NCO/OH equivalent ratio of at least 3.2:1 to form an isocyanate semiprepolymer A), said semiprepolymer having an isocyanate content of from 8 to 15% by weight and a viscosity of at most 3000 mPa.s/25° C. and
   2) reacting via the reaction injection molding technique in a closed mold, said semiprepolymer A) with a component B) consisting essentially of up to 10% by weight of the total amount of said polyol component b) and c) aromatic diamines having an alkyl substituent in at least one ortho-position to the amino groups, at an isocyanate index of from 70 to 130, and wherein the amount of said polyol component b) used to produce said semiprepolymer is at least 90% by weight of the total amount of said polyol component used in both reaction steps.

2. The process of claim 1, wherein said polyisocyanate component contains at least one polyisocyanate of the diphenylmethane series which has been liquefied by chemical modification.

3. The process of claim 1, wherein said component b) contains dispersed organic fillers, 4. The process of claim 1 wherein d) auxiliary agents and additives known per se from polyurethane chemistry are included in either or both of components A) and B).

5. The process of claim 1, wherein component B) includes isocyanate reactive individual components of component d).

6. The process of claim 5, wherein the isocyanate reactive individual components of component d) are selected from the group consisting of 1) aliphatic polyols having molecular weights of from 62 to 1000 optionally containing tertiary amine nitrogen atoms, 2) aliphatic aminopolyethers in the molecular weight range of from 200 to 3000 having at least two primary amino groups per molecule and 3) mixtures of such compounds, said individual components are used in a total quantity of up to 50 equivalents percent in the sense of the isocyanate addition reaction, based on the amino groups of component c).

7. The process of claim 1, wherein said polyol component b) is a polyether polyol having an average molecular weight of from 1500 to 3000 and an average hydroxyl functionality of from 1.9 to 2.1.

8. The process of claim 1, wherein polyether polyols having predominantly secondary hydroxyl groups are used as component b.

9. The process of claim 1, wherein the nature and quantatitive proportions of components a) and b) used for the preparation of the semiprepolymer A) are such that said semipropolymers have an isocyanate content of from 10 to 14% by weight and a viscosity of from 1000 to 2600 mPa.s/25° C.

10. The process of claim 1, wherein 1-methyl-3,5-diethyl-2,4-diaminobenzene or mixtures thereof with 1-methyl-3,5-diethyl-2,6-diaminobenzene are used as component c).

* * * * *